(12) United States Patent
von Hayn et al.

(10) Patent No.: US 7,152,406 B2
(45) Date of Patent: Dec. 26, 2006

(54) MASTER CYLINDER

(75) Inventors: Holger von Hayn, Bad Vilbel (DE); Jürgen Schonlau, Walluf (DE); Manfred Rüffer, Sulzbach (DE); Wolfgang Ritter, Oberursel (DE); Milan Klimes, Zornheim (DE); Torsten Queisser, Frankfurt (DE); Ralf Jakobi, Flörsheim (DE); Michael Vogt, Simmern (DE); Dieter Merkel, Darmstadt (DE); Bernhard Hammes, Hillscheid (DE); Hans-Jörg Feigel, Rosbach (DE); Jose Gonzalez, Idstein (DE); Stephan Krebs, Eschborn (DE); Oliver Kugland, Eppstein (DE); Thomas Sellinger, Offenbach (DE); Guido Schell, Rheinböllen (DE)

(73) Assignee: Continental Teves AG & Co. oHG (DE)

( * ) Notice: Subject to any disclaimer, the term of this patent is extended or adjusted under 35 U.S.C. 154(b) by 30 days.

(21) Appl. No.: 10/521,923

(22) PCT Filed: Jul. 30, 2003

(86) PCT No.: PCT/EP03/08424

§ 371 (c)(1),
(2), (4) Date: Jan. 21, 2005

(87) PCT Pub. No.: WO2004/012974

PCT Pub. Date: Feb. 12, 2004

(65) Prior Publication Data

US 2005/0269180 A1    Dec. 8, 2005

(30) Foreign Application Priority Data

Jul. 30, 2002  (DE) ................................. 102 34 541
May 12, 2003  (DE) ................................. 103 21 380
May 12, 2003  (DE) ................................. 103 21 381

(51) Int. Cl.
    *B60T 11/30*  (2006.01)
(52) U.S. Cl. .......................................................... 60/584
(58) Field of Classification Search .................. 60/584, 60/586
    See application file for complete search history.

(56) References Cited

U.S. PATENT DOCUMENTS 2,809,495 A    10/1957   Ingres (Continued)

FOREIGN PATENT DOCUMENTS

DE              10 39 858 B       9/1958

(Continued)

*Primary Examiner*—Edward K. Look
*Assistant Examiner*—Michael Leslie
(74) *Attorney, Agent, or Firm*—RatnerPrestia

(57) ABSTRACT

The invention relates to a master cylinder with a pressure chamber formed in a housing of the master cylinder and a reservoir bore for accommodating a pressure fluid reservoir, a valve with a closing element being provided which due to a pressure difference prevailing between the pressure chamber and the pressure fluid reservoir can be moved into an opening position or a closing position, the valve in its opening position allowing a pressure fluid flow from the pressure fluid reservoir into the pressure chamber and throttling or preventing, in its closing position, a pressure fluid flow from the pressure chamber into the pressure fluid reservoir.

Means are provided which maintain the closing body in its opening position when it is acted upon by a closing pressure difference during vacuum filling of the brake system.

25 Claims, 13 Drawing Sheets

U.S. PATENT DOCUMENTS

| | | | | |
|---|---|---|---|---|
| 4,773,224 A | * | 9/1988 | Sakamoto et al. | 60/585 |
| 6,405,534 B1 | * | 6/2002 | Boeing et al. | 60/584 |
| 6,438,955 B1 | | 8/2002 | Chiba et al. | |
| 6,637,201 B1 | * | 10/2003 | Hirayama et al. | 60/585 |
| 6,912,851 B1 | * | 7/2005 | Batchelor et al. | 60/584 |

FOREIGN PATENT DOCUMENTS

| | | |
|---|---|---|
| DE | 90 16 775 | 4/1992 |
| DE | 196 39 560 A1 | 4/1998 |
| JP | 2000/142365 | 5/2000 |
| WO | WO 96/37392 | 11/1996 |

* cited by examiner

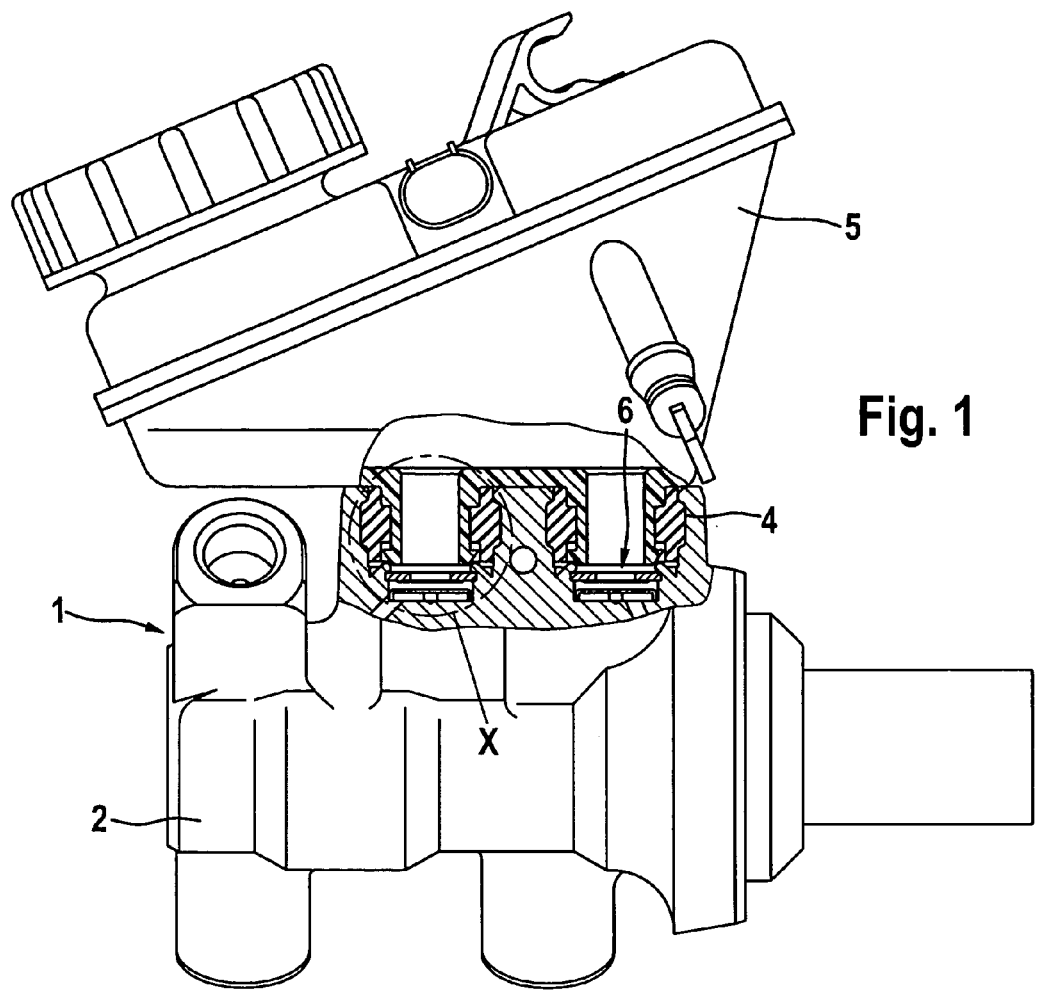
Fig. 1
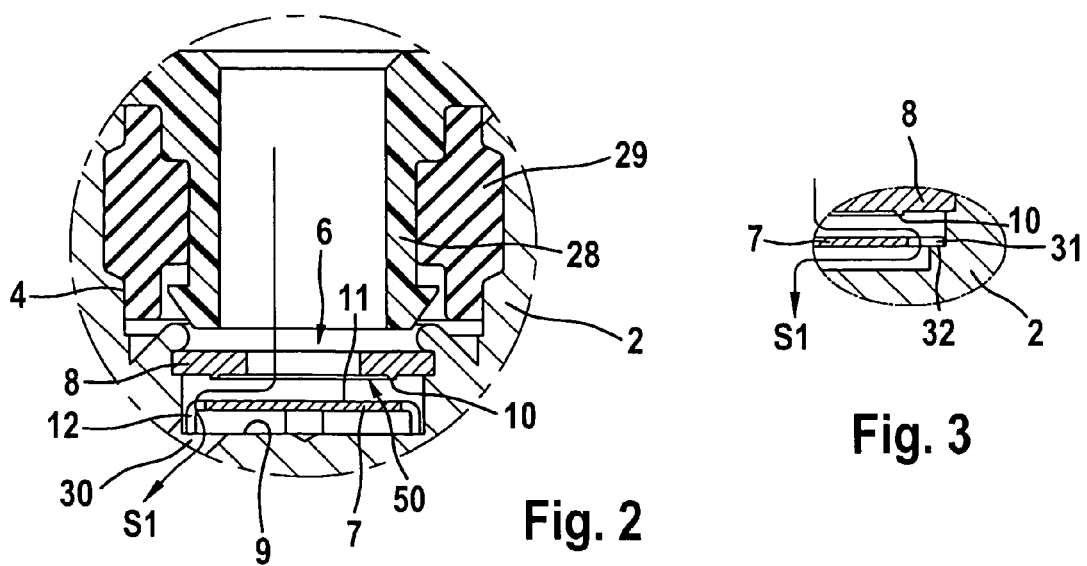
Fig. 2
Fig. 3

MASTER CYLINDER

TECHNICAL FIELD

The invention relates to a master cylinder, in particular for a hydraulic brake system with at least one pressure chamber provided in a housing of the master cylinder and at least one reservoir bore for accommodating a pressure medium reservoir, a valve with a closing element being provided which can be moved into an opening or closing position due to a pressure difference prevailing between the pressure chamber and the pressure fluid reservoir, the valve in its opening position allowing the pressure fluid to flow from the pressure fluid reservoir into the pressure chamber and in its closing position throttling or preventing the pressure fluid to flow in the opposite direction from the pressure chamber into the pressure fluid reservoir.

BACKGROUND OF THE INVENTION

With master cylinders there is the problem that the lost travel to be overcome when actuating the master cylinder is relatively significant, i.e. the driver of a motor vehicle has to press down the brake pedal to a relatively high degree before the pressure in the brake system is increased, thus braking the vehicle. The reason for this relatively long lost travel resulting from actuating the brake is primarily that pressure pistons in the master cylinder, starting from an idle position of the pressure pistons at the beginning of the actuation, must be displaced by a relatively great extent in the direction of the actuation before the pressure fluid connection between the pressure fluid reservoir and the pressure chambers in the master cylinder is interrupted. No significant amount of pressure can be built up in the pressure chambers of the master cylinder unless this pressure fluid connection is interrupted.

Principally, however, a smallest possible lost travel is required because this guarantees a quick reaction of the brake system giving the driver the sensation that his brake system is properly working.

The brake system is first filled with brake fluid at the manufacturer's site by means of vacuum filling. This means that the system is evacuated before being filled with pressure fluid, i.e. the air is completely removed from the brake system. After having been evacuated, the brake system is filled with pressure fluid under pressure. Due to the evacuation there is no need for a complex, retroactive venting of the system.

A filling head is mounted on the pressure fluid reservoir, which serves for the evacuation and the vacuum filling. During evacuation it is necessary to maintain the closing element of the valve in its opening position so that the air can escape unhindered from the brake system through the reservoir.

U.S. Pat. No. 6,438,955 B1 discloses a master cylinder with a valve arrangement for reducing the lost travel, in which the valve arrangement includes a closing element arranged in a reservoir bore, the valve seat thereof being built by a reservoir connecting socket and, due to a pressure difference prevailing between the pressure chamber and the pressure fluid reservoir, being movable into an opening position or a closing position. In the closing position there is a throttled pressure fluid connection between the pressure chamber and the pressure fluid reservoir.

A disadvantage of this valve arrangement is that the closing element is arranged directly at the pressure fluid reservoir, which may cause significant tolerances having a negative effect on the reduction of the lost travel.

It is, however, particularly unfavorable that the closing element is not in its opening position due to the pressure difference caused during the evacuation of the brake system, but is moved into the closing position thus hindering the air to escape from the brake system.

BRIEF SUMMARY OF THE INVENTION

It is therefore an object of the present invention to develop a master cylinder in such a way that the valve allows a reduction of the lost travel as well as a vacuum filling of the brake system.

The object is achieved by using means which maintain the closing element, acted upon by a closing pressure difference due to an evacuation of the brake system for the purpose of vacuum filling, in the opening position and allow the closing element to be moved into the closing position when the brake is actuated. Thus, it is achieved that the valve, on the one hand, requires only a very short lost travel because the pressure in the pressure chamber is built up when the pressure piston begins to move, while on the other hand the valve does not hinder the air to escape during the evacuation of the brake system, so that the air can escape from the brake system in an unthrottled manner.

In an advantageous development of the invention, the valve includes a first abutment element arranged in the reservoir bore on which the closing element abuts in the closing position, the closing element being arranged in a movable manner between the abutment element and the bottom of the reservoir bore, and the abutment element includes a circumferential sealing bead on a bottom side facing the closing element, which is arranged in such a way that a radially external area of the upper side of the closing element in a closing position abuts on the sealing bead in a sealing manner. The first abutment element is arranged in the reservoir bore e.g. by caulking. Other fastening possibilities are also feasible, such as e.g. screwing in, pressing by means of a threaded ring or fastening by means of a circlip. The closing element of the valve is not arranged on a pin of the pressure fluid reservoir so that small tolerances can be maintained.

In an advantageous embodiment of the present invention, the closing element is formed as a disc provided with webs formed towards the bottom of the reservoir bore in order to guarantee the pressure fluid flow from the pressure fluid reservoir into the pressure chamber, the webs abutting on the bottom in the opening position.

Another possibility of guaranteeing the pressure fluid flow from the pressure fluid reservoir into the pressure chamber consists in that the disc is provided with circumferential webs allowing in the opening position that the disc abuts on a circumferential shoulder of the reservoir bore.

In an advantageous development of the present invention the valve opens in the closing position when a certain pressure difference is reached and allows the unthrottled pressure fluid flow from the pressure chamber into the pressure fluid reservoir. Thus, on the one hand, under certain operating conditions the excess pressure fluid volume or residual pressure, respectively, can be reduced, while on the other hand the aspiration from the pressure fluid reservoir by means of a pump in case of a controlled brake intervention (without foot force), e.g. in case of an intervention of TCS or ESP, is not hindered since in this case the valve also opens. This is particularly important in case of low temperatures, where the flow resistance is relatively high, anyway. The structure according to the present invention provides for a brake system with a very small lost travel which, in addition to this, is suitable for controlling the brake system where the driver does not actuate the brake pedal.

On its bottom side, the abutment element is preferably provided with projections serving as fulcrum to the closing element in the closed position when the pressure difference is reached which opens the valve, the closing element deflecting and the radially external area of the upper side of the closing element lifting off the sealing bead and the pressure fluid flowing in an unthrottled manner from the pressure chamber into the pressure fluid reservoir. To this end, the closing element can be formed as a disc, which is dimensioned in such a way that deflection is possible without damage. Thus it is achieved that the excess pressure fluid volume or a residual pressure, respectively, can be reduced without a complicated structure of the valve.

According to an advantageous embodiment of the present invention, the valve is provided with a second abutment element with channels following the first abutment element in the reservoir bore towards the bottom, the second abutment element serving as a support for the closing element in the opening position. The channels guarantee in this case that the pressure fluid flow into the pressure chamber is not hindered. At the same time the two abutment elements build a mounting unit.

The present invention provides different solutions for maintaining the closing element open during the evacuation process.

According to an advantageous embodiment, an adhesive maintains the closing element in the opening position when the brake system is evacuated, the adhesive detaching when it comes into contact with the pressure fluid during the vacuum filling, so that no additional components are required.

According to another advantageous embodiment, a clamping element maintains the closing element in the opening position when the brake system is evacuated, disengaging during the vacuum filling with pressure fluid.

In another advantageous embodiment, in the first abutment element a sleeve-type tensioning element is provided which during the evacuation of the brake system protrudes from the abutment element towards the closing element in such a manner that the closing element is maintained in the opening position, where a pressure difference caused by the first brake actuation and closing the valve causes the closing element to move into the closing position, the closing element pushing back the clamping element into the first abutment element so that the closing element can move into the closing position when the brake is actuated. In case of a reduction of the residual pressure the clamping ring is pushed further into the first abutment element due to the deflection of the closing element and cannot detach from the abutment element. The clamping ring permits a very simple assembly since it is inserted from the side facing the reservoir into a bore of the first abutment element.

According to another favorable embodiment of the present invention, the closing element is provided with circumferential locking elements maintaining the closing element in the opening position by means of a mechanical locking device when the brake system is evacuated, the mechanical locking device being releasable by the filling of the pressure fluid when the system is filled under vacuum. Here again different configurations are conceivable. For example, the closing element can include locking elements in the form of pins, which are arranged on its circumference or its bottom side. The pins are arranged in grooves for evacuating the brake system, a spring guaranteeing this opening position. If the brake system is filled with pressure fluid, the pins are released from the grooves by the pressure difference prevailing at the closing element and a closing position of the closing element is possible again in case of brake actuation.

The closing element can be provided with blade-type elements on its circumference that turn the closing element out of the mechanical locking device by means of the pressure fluid filling.

Furthermore, pins can be used for the mechanical lock, which e.g. are arranged on the connecting socket of the pressure fluid reservoir and maintain the closing element in its opening position during the evacuation process.

Another favorable embodiment of the present invention and a method for this results in that a magnetic field acting from the outside maintains the opening element in its opening position. The material of the opening element and the abutment elements is chosen in such a way that the closing element is repelled by the first abutment element due to the magnetic field which is generated e.g. by means of a yoke and a coil outside of the master cylinder when the brake system is evacuated, thus being maintained in the opening position, so that the air can flow unhindered from the pressure chamber into the pressure fluid reservoir and the brake system can be vented. Different ways are possible for generating the magnetic field. A generation by means of a permanent magnet is possible, for example.

According to another favorable embodiment of the invention, a weight is fastened at the closing element during the evacuation of the brake system, which maintains the closing element in the opening position. The material of this weight is chosen in such a way that the weight is nearly neutralized in the pressure fluid when the brake is actuated.

The valve is preferably provided with a throttled pressure fluid connection allowing a throttled pressure fluid flow from the pressure chamber into the pressure fluid reservoir when the closing element is in its closing position. Thus, it is possible to reduce the dynamic pressure at the valve without actuating the closing element. The throttled pressure fluid connection can be configured, e.g. as a parallel path or as a restrictor arranged on the first abutment element.

In a favorable development of the present invention, the valve is inserted in a connecting area between the master cylinder and the pressure fluid reservoir. The reason for this is that several ways lead from the pressure chamber to the pressure fluid reservoir, e.g. the breathering bore and the supply bore. If necessary, the connection is made by way of a central valve in the piston and the supply bore. These ways converge in the connecting area between the master cylinder and the reservoir so that the valve is active in any case, independent of the way of the pressure fluid flow. In this case it is especially useful to arrange the valve in a connecting socket of the pressure fluid reservoir. Thus, the invention is also suitable as a drain protection for the reservoir.

The valve is preferably provided with a valve housing in which a valve seat is arranged which can be displaced in longitudinal direction, a second channel being connectable by means of the valve seat. The second channel allows a quick reduction of the residual pressure in the pressure chamber when a certain pressure difference is reached. According to a favorable development the valve seat can be used for accommodating the throttled pressure fluid connection or at least restricting in part the throttled way, e.g. by inserting a groove in the border or a bore alongside of the center line of the valve seat, thus resulting in a particularly simple structure of the valve.

Another favorable development provides a particularly flat construction of the valve, which includes a valve body, a sealing member with a sealing lip and a leaf spring, the sealing lip allowing the pressure fluid to flow from the pressure fluid reservoir into the pressure chamber, and the leaf spring allowing the pressure fluid to flow in the opposite direction when a certain pressure difference is reached. In another favorable development of the present invention, the sealing element may include a second sealing lip instead of a leaf spring, the first sealing lip allowing the pressure fluid to flow from the pressure fluid reservoir into the pressure chamber and the second sealing lip allowing the pressure fluid to flow in the opposite direction when a certain pressure difference is reached.

The valve body is preferably provided with a permeable membrane allowing the throttled pressure fluid flow from the pressure chamber into the pressure fluid reservoir.

BRIEF DESCRIPTION OF THE DRAWINGS

FIG. 1 a first embodiment of the master cylinder according to the present invention with a pressure fluid reservoir;

FIG. 2 an enlarged detail X of the first embodiment according to FIG. 1;

FIG. 3 a detail of the second embodiment of the master cylinder according to the present invention;

DETAILED DESCRIPTION OF THE PREFERRED EMBODIMENTS

Figure 4:
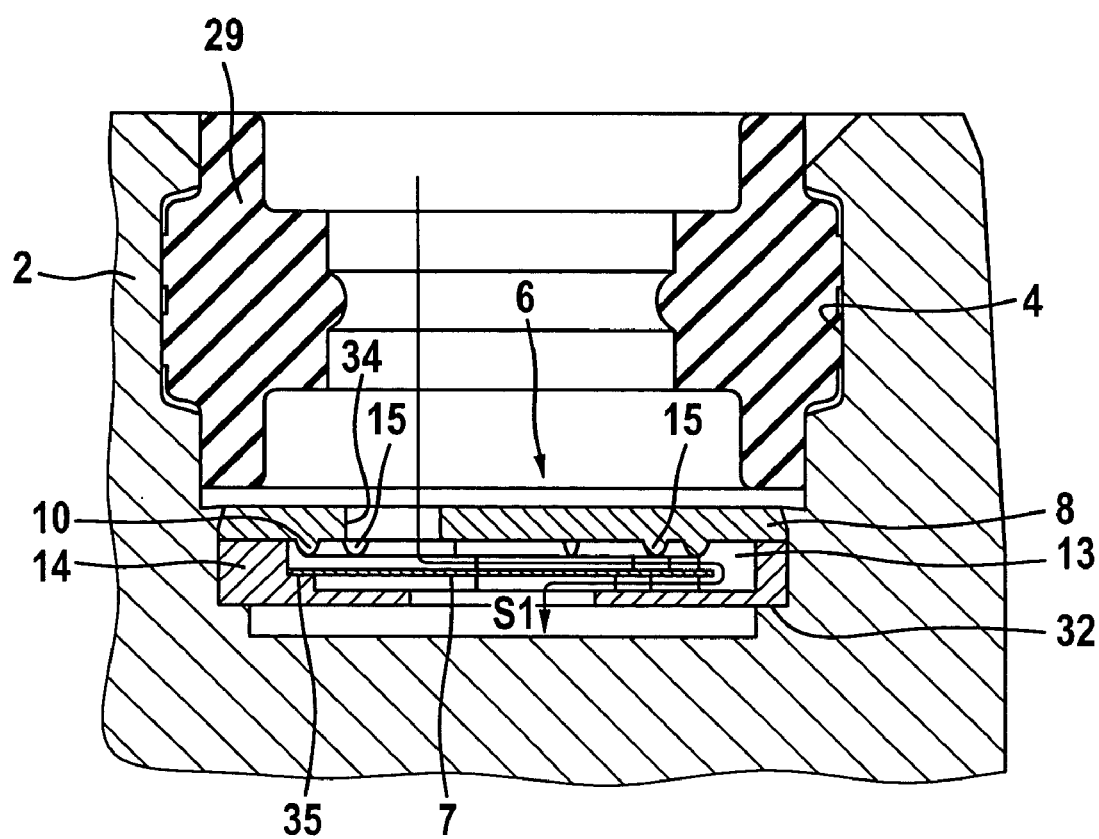
FIG. 4 a detail of a third embodiment of a master cylinder according to the present invention.

FIG. 1 shows a first embodiment of a master cylinder 1 for a hydraulic brake system with two pressure chambers 3 (not shown) provided in a housing 2 of master cylinder 1 and two reservoir bores 4 for accommodating a pressure fluid reservoir 5. Reservoir bore 4 is provided with a valve 6 allowing a reduction of the lost travel as well as a vacuum filling of the brake system. The working method of such a master cylinder 1 is known so that it is only described as far as it is important for the invention. The working method of master cylinder 1 can also be evinced from the described state of the art.

FIG. 2 shows an enlarged detail X of the master cylinder 1 represented in FIG. 1. The pressure fluid reservoir 5 is arranged in the reservoir bores 4 of the master cylinder 1 by means of connecting sockets 28 and sealing elements 29. The valve 6 includes a first ring-type abutment element 8 arranged in the reservoir bore 4 and a closing element 7 provided as a thin disc and arranged between the abutment element 8 and a bottom 9 of the reservoir bore 4.

The valve 6 can be moved into a opening position or a closing position due to the pressure difference prevailing between the pressure chamber 3 and the pressure fluid reservoir 5. In the opening position of the valve, in which the disc 7 is in a lower position, the pressure fluid flow S1 is possible from the pressure fluid reservoir 4 through the pressure fluid channel 30 into the pressure chamber 3. In the closing position in which the disc 7 abuts on the first abutment element 8 due to the pressure difference, a pressure fluid flow S2 from the pressure chamber 3 into the pressure fluid reservoir 5 in the opposite direction of pressure fluid flow S1 is throttled or prevented.

On its outer circumference towards the bottom 9, the disc 7 is provided with webs 12 through which the pressure fluid can flow so that the disc 7 in the opening position shown in FIG. 2 does not abut on the bottom 9 of the reservoir bore 4 thus not being able to close the pressure fluid channel 30.

In prior art master cylinders, the actuation of the master cylinder up to overriding a closing path causes pressure fluid to be transported back into the pressure fluid reservoir 5 through a pressure fluid channel 30 by means of a piston movement (second pressure fluid flow S2 from the pressure chamber 3 into the pressure fluid reservoir 5). In order to block the pressure fluid connection towards the pressure fluid reservoir 5 in case of a brake actuation at the very beginning of the piston movement thus reducing the lost travel of the master cylinder 1, the disc 7 is moved into its closing position by means of the pressure difference caused between the pressure chamber 3 and the pressure fluid reservoir 5. The first abutment element 8 is provided with a circumferential sealing bead 10 on a bottom side 50 facing disc 7 on which the disc 7 in its closing position abuts in a sealing manner with a top face 11. The valve 6 blocks the pressure fluid flow S2 before overriding the closing path and the pressure fluid is displaced into the brake system.

In certain operating modes of the brake system it is necessary to reduce excess pressure fluid or a residual pressure, respectively, in the pressure chamber 3. This can be achieved by means of a restrictor 33 (not shown) arranged, e.g., in the disc 7 or in the sealing bead 10 of the first abutment element 8, thus reducing the residual pressure in the closing position of valve 6 without actuating the closing element in the form of a throttled pressure fluid flow D.

The fastening of the first abutment element 8 in the reservoir bore 4 can be achieved, as shown in FIG. 2, by means of caulking. Also further fastening possibilities, as e.g. screwing in, pressing on by means of a threaded ring or fastening by means of a circlip, are conceivable. Thus valve 6 is not arranged on the connection socket 28 of the pressure fluid reservoir so that small tolerances can be maintained.

FIG. 3 shows a detail of a second embodiment of a master cylinder 1. The closing element 7 of the valve 6 is also formed as a disc and is provided on its circumference with webs 31 formed towards the outside which in the opening position serve as support for the disc 7 on a shoulder 32 in the reservoir bore 4. The webs 31 are distributed on the circumference of the disc in such a way that the pressure fluid flow S1 to the pressure chamber 3 is realized through a space between two webs 31.

A third embodiment of a master cylinder 1 with a valve 6 is represented in FIG. 4. Here a second abutment element 14 is provided which abuts on the shoulder 32 of the reservoir bore 4. The first abutment element 8 abuts on the second abutment element 14, where both abutment elements 8,14 are securely maintained in this position by fastening the first abutment element 8 in the reservoir bore 4. The closing element 7 formed as a disc is arranged between the two abutment elements 8,14 serving as abutment for this closing element in the opening and in the closing position. The second abutment element 14 is provided with supporting surfaces 35 for disc 7 and with channels 13 allowing the first pressure fluid flow S1 from the pressure fluid reservoir 5 into the pressure chamber 3 when the disc 7 abuts in its opening position on the abutment element 14 and by which the disc 7 does not abut with its entire circumference on the second abutment element 14. As described in FIG. 2, the first abutment element 8 is provided with the sealing bead 10 on which disc 7 in its closing position abuts in a sealing manner.

In order to reduce excess pressure fluid or a residual pressure in the pressure chamber 3 the first abutment element 8, additionally to through-bores 34 and the circumferential sealing bead 10, is provided with several projections 15 arranged in a circular manner within the sealing bead 10 serving as a fulcrum H to the disc 7. If the valve 6 is in its closing position, it deflects when a certain pressure difference is reached so that the radially external area of the top side 11 of the disc detaches from the sealing bead 10 thus opening the valve 6. This function is described more in detail in a fourth embodiment according to the FIGS. 5 to 7.

Figure 7:
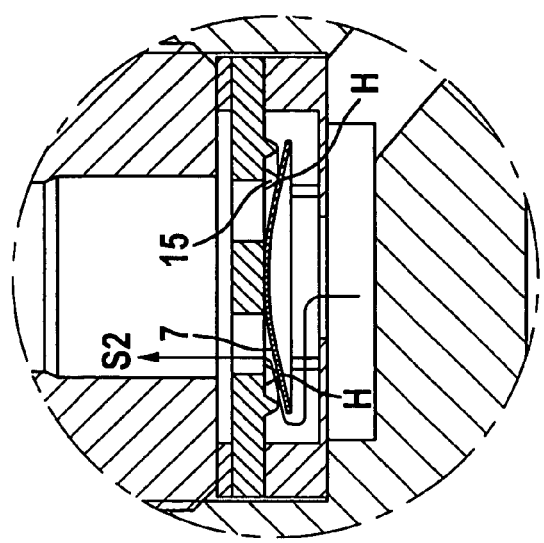
FIGS. 5 to 7 a fourth embodiment of a master cylinder according to the present invention in different operating conditions.
Figure 6:
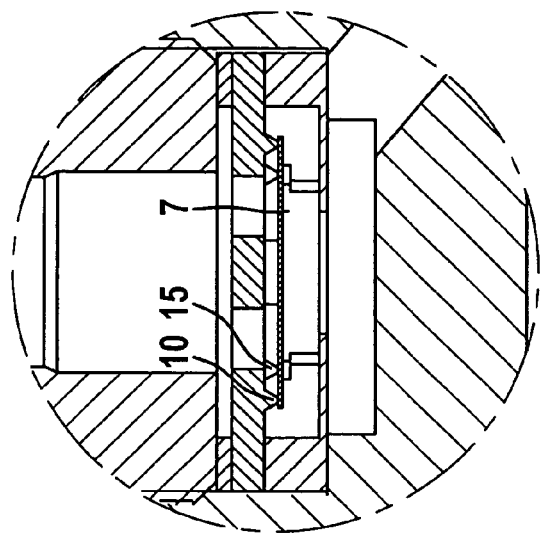
Figure 5:
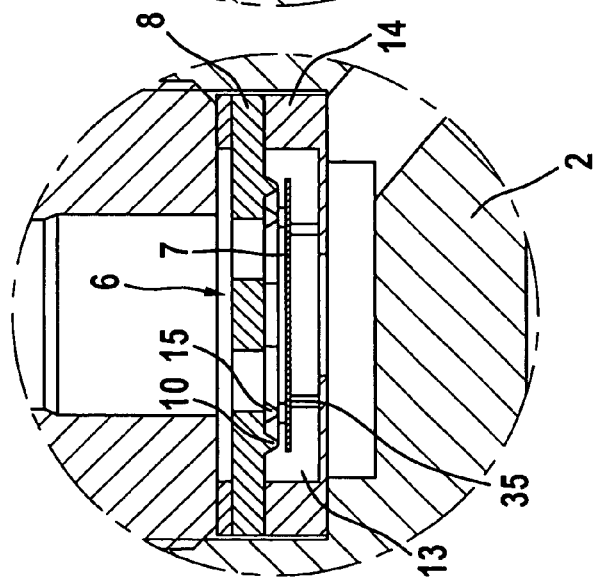

The FIGS. 5 to 7 show details of a fourth embodiment of a master cylinder 1 in three different operating conditions, this embodiment differing only with regard to the fastening of the first abutment element 8 in the reservoir bore 4 from the third embodiment shown in FIG. 4. FIG. 5 shows the valve 6 in its opening position, in which the pressure fluid is aspirated from the pressure fluid reservoir 5 into the pressure chamber by a back-movement of the piston (first pressure fluid flow S1). The disc 7 is displaced towards the second abutment element 14 by means of the pressure difference thus caused and abuts on it on the supporting surfaces 35, the channels 13 being provided therein allowing the pressure fluid flow S1.

FIG. 6 shows the valve during the actuation of the master cylinder 1. The piston movement displaces the pressure fluid from the pressure chamber 3 so that disc 7 is moved upwards into the closing position and top side 11 of disc 7 abuts on the sealing bead 10 preventing the pressure fluid flow S2 towards the pressure fluid reservoir 5. The projections 15, which are arranged within the sealing bead 10 in a circular manner, do not exceed the height of the sealing bead 10 thus guaranteeing the sealing abutment of the disc 7 on the first abutment element 8.

In order to reduce, e.g. a residual pressure in the pressure chamber 3, the valve 6 in its closing position must open when a certain pressure difference is reached and allow an unthrottled pressure fluid flow S2 from the pressure chamber 3 into the pressure fluid reservoir 5. This is achieved by the projections 15, as already described in FIG. 4, which serve as a fulcrum H when a certain pressure difference of disc 7 is reached, the disc 7, as described in FIG. 7, deflecting in the middle towards the pressure fluid reservoir 5 abutting on the fulcrums H and thus detaching from the sealing bead 10.

The brake system is first filled with pressure fluid at the manufacturer's site by means of vacuum filling. To this end the system is evacuated, i.e. the air is removed entirely from the brake system, before being filled with pressure fluid. After the evacuation the brake system is under pressure when filled with pressure fluid. Due to the evacuation, a complex subsequent venting of the brake system is no longer necessary.

A filling head is mounted on the pressure fluid reservoir 5 for evacuation and vacuum filling. During the evacuation it is necessary to maintain the closing element 7 of the valve 6 in its opening position so that the air can escape from the brake system in an unhindered manner through the reservoir. This is guaranteed by that the closing element 7 is fixed in its opening position during the evacuation, without an air flow L being able to entrain the closing element 7 causing it to move into the closed position.

Thus, valve 6 performs the following four functions:
1. Free passage for the air from the master cylinder 1 to the pressure fluid reservoir 5 during the evacuation of the brake system. This function is necessary for the vacuum filling of the brake system at the manufacturer's site and has to be guaranteed only once.
2. Free passage for pressure fluid from the pressure fluid reservoir 5 to the master cylinder 1, if the system is filled with fluid at the manufacturer's site.
3. Blocking of a pressure fluid flow S2 coming from the master cylinder 1 up to approx. 3 bar. Valve 6 opens, if 3 bar are exceeded.
4. Aspiration of pressure fluid into the master cylinder 1.

FIGS. 8 to 20 show different embodiments of a master cylinder 1 with a valve 6 for reducing the lost travel which also allows a vacuum filling. Thus the master cylinder 1 satisfies the four requirements mentioned above.

Figure 8:
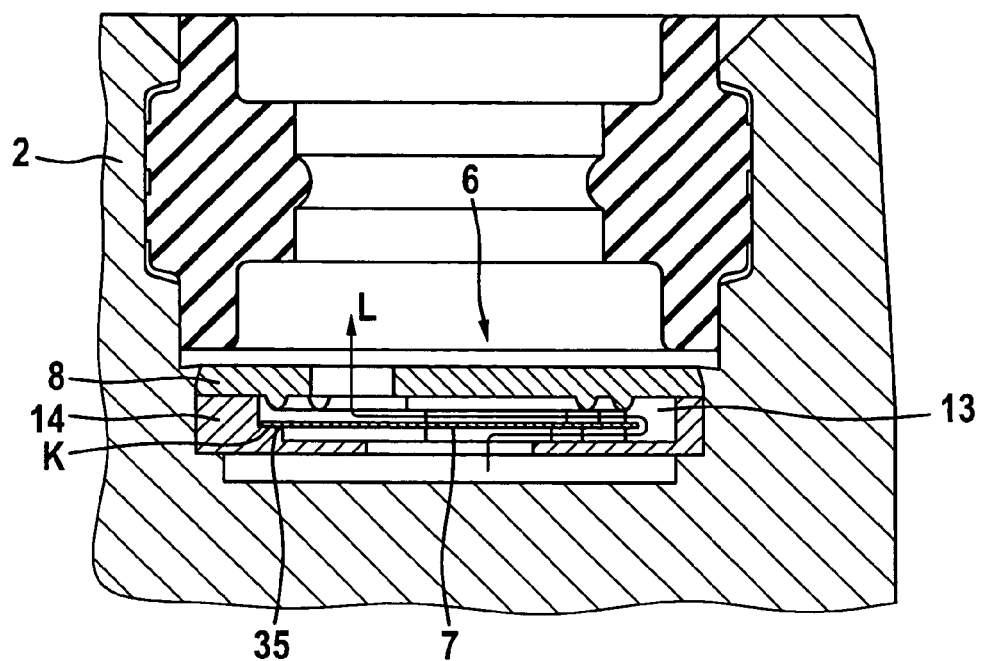
FIGS. 8 to 9 a master cylinder according to FIG. 4 during the evacuation of the brake system.
Figure 9:
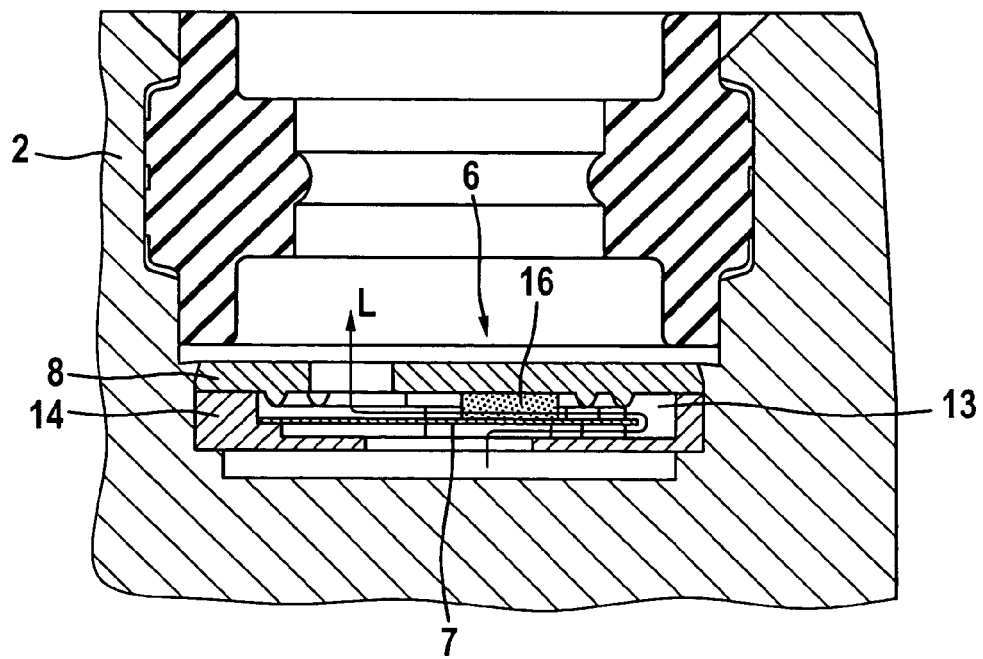

FIG. 8 and FIG. 9 show the third embodiment according to FIG. 4 during the evacuation of the brake system. As already described, disc 7 has to be maintained in its opening position on the second abutment element 14 during this process, in order to allow and guarantee an air flow L from the pressure chamber 3 into the pressure fluid reservoir 5 through the channels 13 of the second abutment element 14. In FIG. 8 the disc 7 is therefore stuck on the support surfaces 35 of the second abutment element 14. The adhesive K dissolves when coming into contact with the pressure fluid during the filling of the brake system, so that the disc 7 can again be moved between the two abutment elements 8,14 and the valve 6 performs the required functions when the brake is actuated.

FIG. 9 represents a further solution for maintaining the disc 7 in its opening position for evacuation. A clamping element 16 is clamped between the disc 7 and the first abutment element 8 thus maintaining the disc 7 in its lower position. If the brake system is filled with pressure fluid, the clamping element 16 detaches and disc 7 can again be moved. The clamping element 16 is formed and positioned in valve 6 in such a way that the air flow L is not obstructed during evacuation.

In FIGS. 10 to 13 a fifth embodiment of a master cylinder 1 is represented. In order to allow the vacuum filling a sleeve-type tensioning element 17 is inserted in a bore 36 of the first abutment element 8. As becomes apparent from FIG. 10, the tensioning element 17 is pressed in by such an amount that disc 7 is pressed onto the second abutment element 14 in the opening position. The tensioning element 17 is dimensioned in such a way that the disc 7 does not leave this position during evacuation. The air flow L is led through the pressure fluid channel 30 through the channels 13 of the second abutment element 14 and the through-bores 34 of the first abutment element 8 into the pressure fluid reservoir 5.

Figure 11:
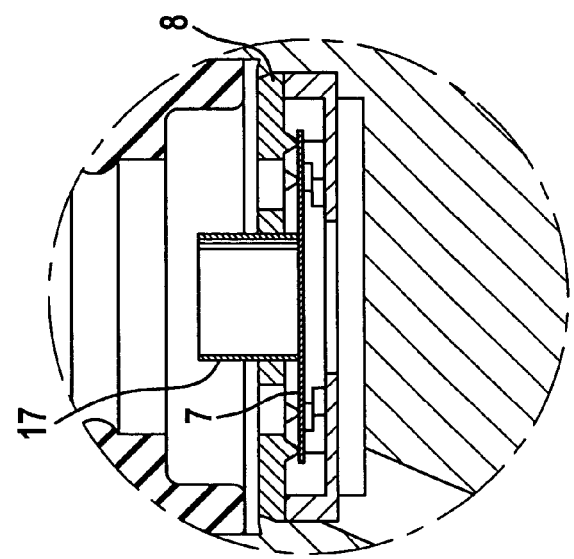
Figure 10:
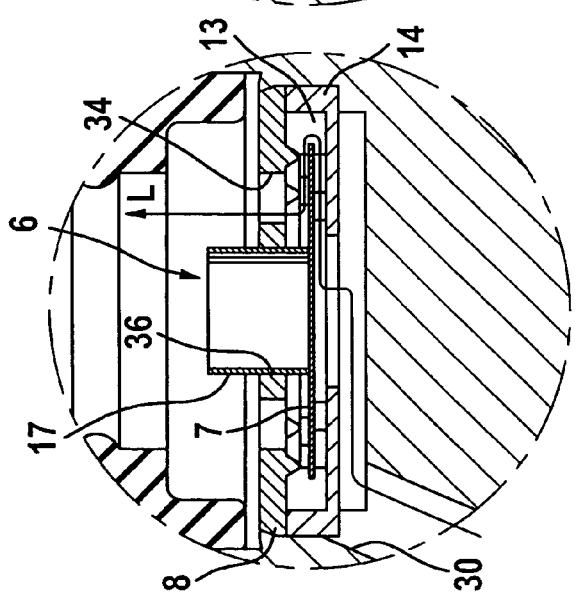

FIG. 11 shows valve 6 after a first brake actuation. Disc 7 is caused to move in its closing position by a pressure difference resulting from a first brake actuation, the disc 7 abutting in this position on the first abutment element 8. Thus also clamping element 17 is displaced in said direction and valve 6 is fully functional.

Figure 12:
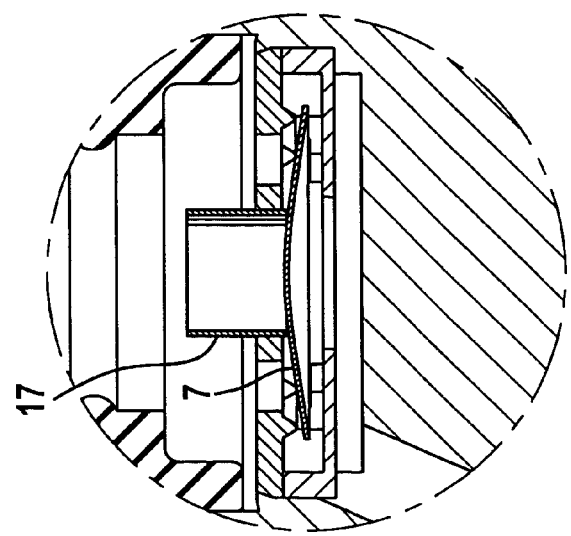
FIGS. 10 to 13 a fifth embodiment of a master cylinder according to the present invention in different operating conditions.

FIG. 12 shows the valve 6 during the reduction of the residual pressure, the disc 7 deflecting in its closing position, as described in FIG. 7, so that it detaches from the sealing bead 10 thus allowing the reduction of the residual pressure. The tensioning element 17 is pushed further back into the first abutment element 8 by the deflection of the disc 7, not detaching from the abutment element 8.

Figure 13:
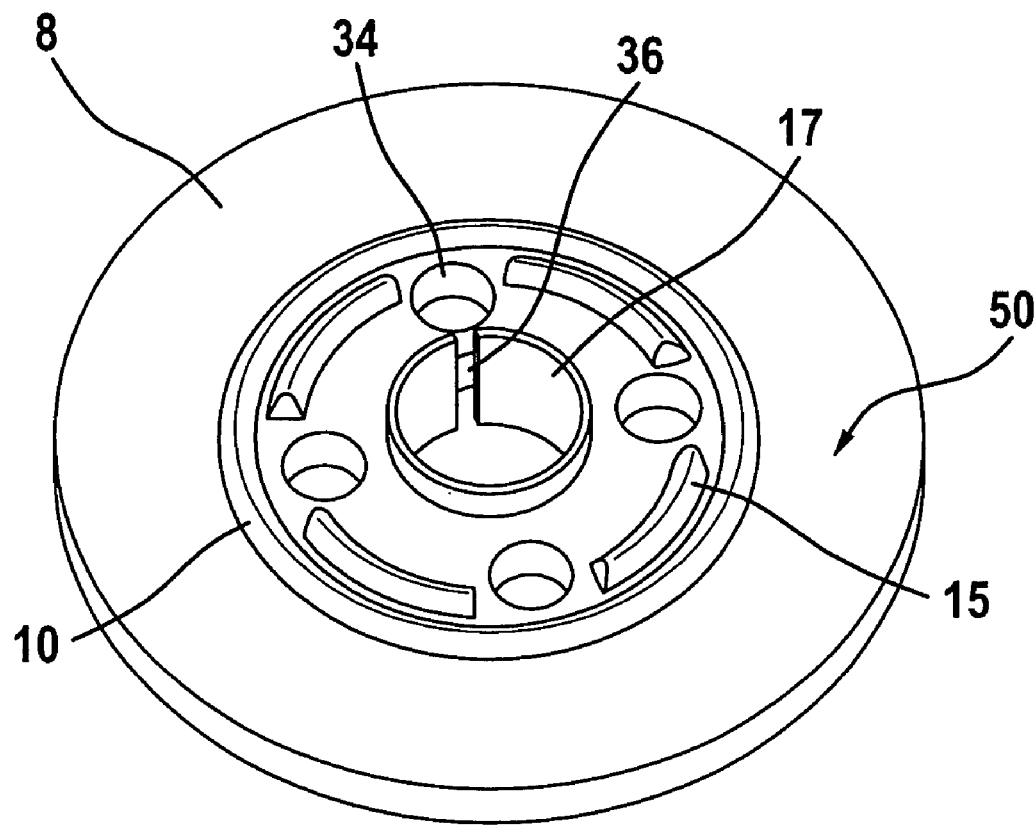
Figure 14:
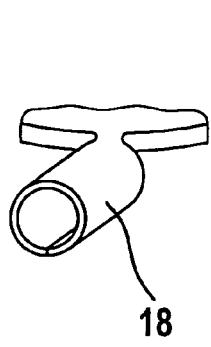
FIGS. 14 to 19 a sixth embodiment of a master cylinder according to the present invention.

FIG. 13 shows the first abutment element 8 with the tensioning element 17 mounted in bore 36. Here it appears that on the bottom side 50 of the abutment element 8 the circumferential sealing bead 10 is arranged outside the projections 15 arranged in a circular manner and serving as fulcrum H to disc 7 when the residual pressure is reduced. The through-bores 34 are arranged with the projections 15 in such a way that the pressure fluid flow S2 into the pressure fluid reservoir 5 is not prevented when the disc 7 abuts on the fulcrum H.

Figure 15:
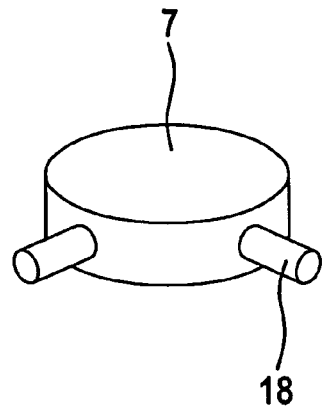
Figure 16:
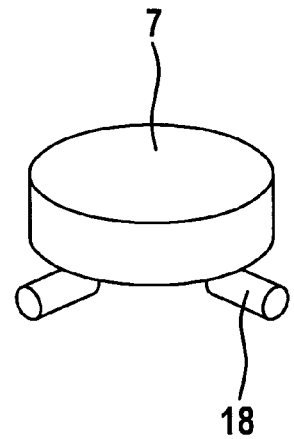
Figure 17:
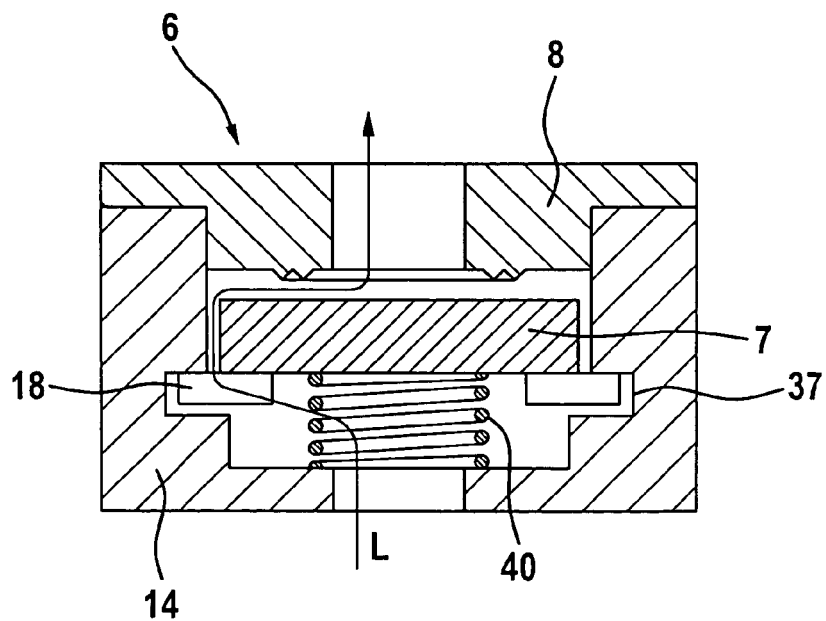
Figure 18:
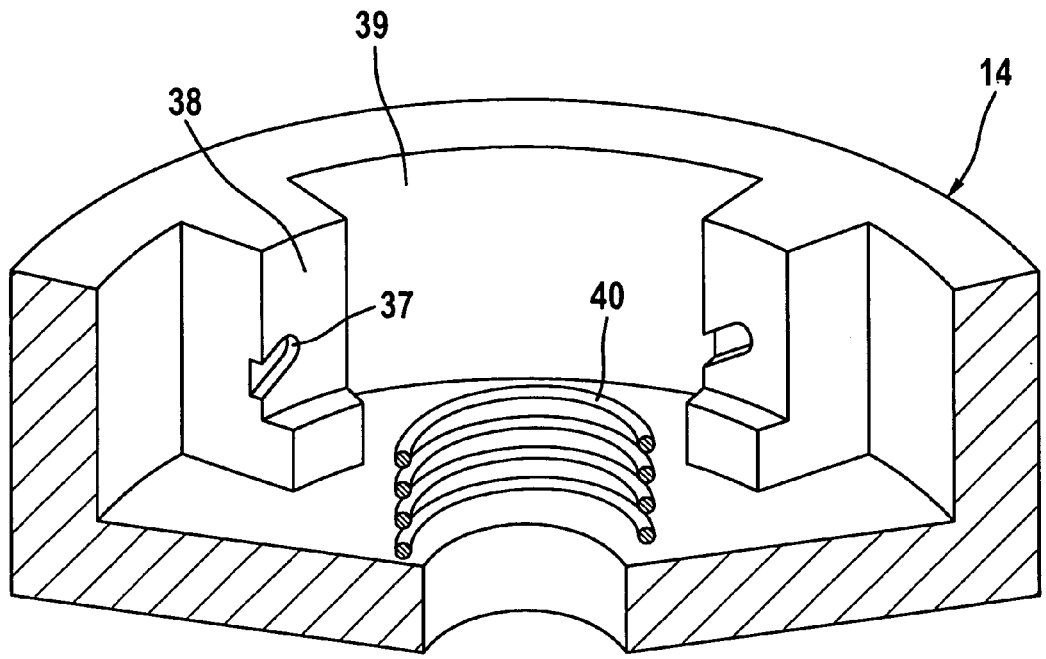
Figure 19:
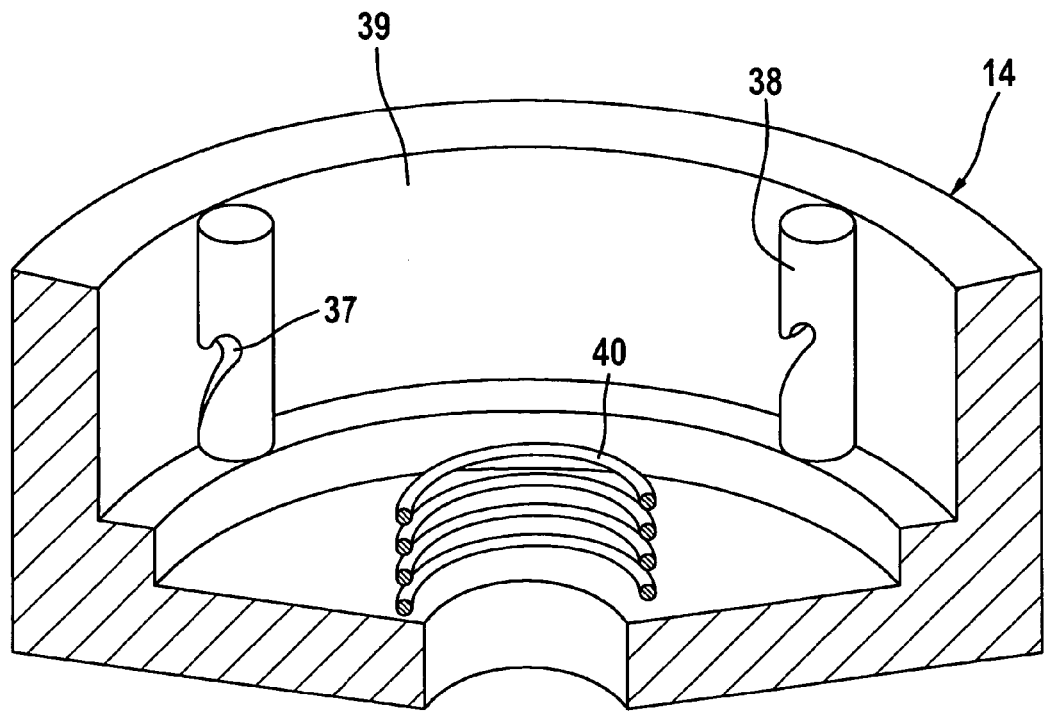

FIGS. 14 to 19 show a sixth embodiment of a master cylinder 1 with the valve 6 for reducing the lost travel and vacuum filling. A mechanical lock maintains the disc 7 in its opening position, disc 7 being unlocked by the filling pressure during the vacuum filling. As can be seen from the FIGS. 14 to 16, to this end locking elements 18 formed as pins are arranged on the circumference of disc 7 which either are formed during the manufacturing of disc 7 (FIG. 14) or are subsequently added by means of suitable methods, as e.g. welding (FIG. 15). From FIG. 16 can be seen that the locking elements 18 may also be formed on the bottom side of the disc 7. FIG. 17 shows the valve 6 during the evacuation. The pins 18 engage in grooves 37 being arranged in an inclined manner in the second abutment element 14, the grooves 37 being closed at the upper end and open in tangential direction at the lower end. As can be seen from FIGS. 18 and 19, the grooves 37 are provided in projections 38 projecting from an inner wall 39 of the second abutment element 14 radially towards the inside. The projections 38 may also be added subsequently during the manufacturing of the abutment element 14. FIG. 19 shows projections 38 formed as pins and fastened on the inner wall 39 of abutment element 14.

A spring 40 acting on disc 7 from below maintains disc 7 in its opening position when it is in the position indicated in the drawing (FIG. 17) and cannot be detached during evacuation by the air flow L from master cylinder 1 to pressure fluid reservoir 5.

If the pressure of the pressure fluid counteracting spring 40 is applied to disc 7 during the filling of the brake system, disc 7 is displaced by a small turn out of the grooves 37 against the pressure of spring 40. The disc 7 can now move freely upwards into its closing position when the brake is actuated thus locking the pressure fluid flow S2 from the pressure chamber 3 by abutting on the first abutment element 8.

Figure 20:
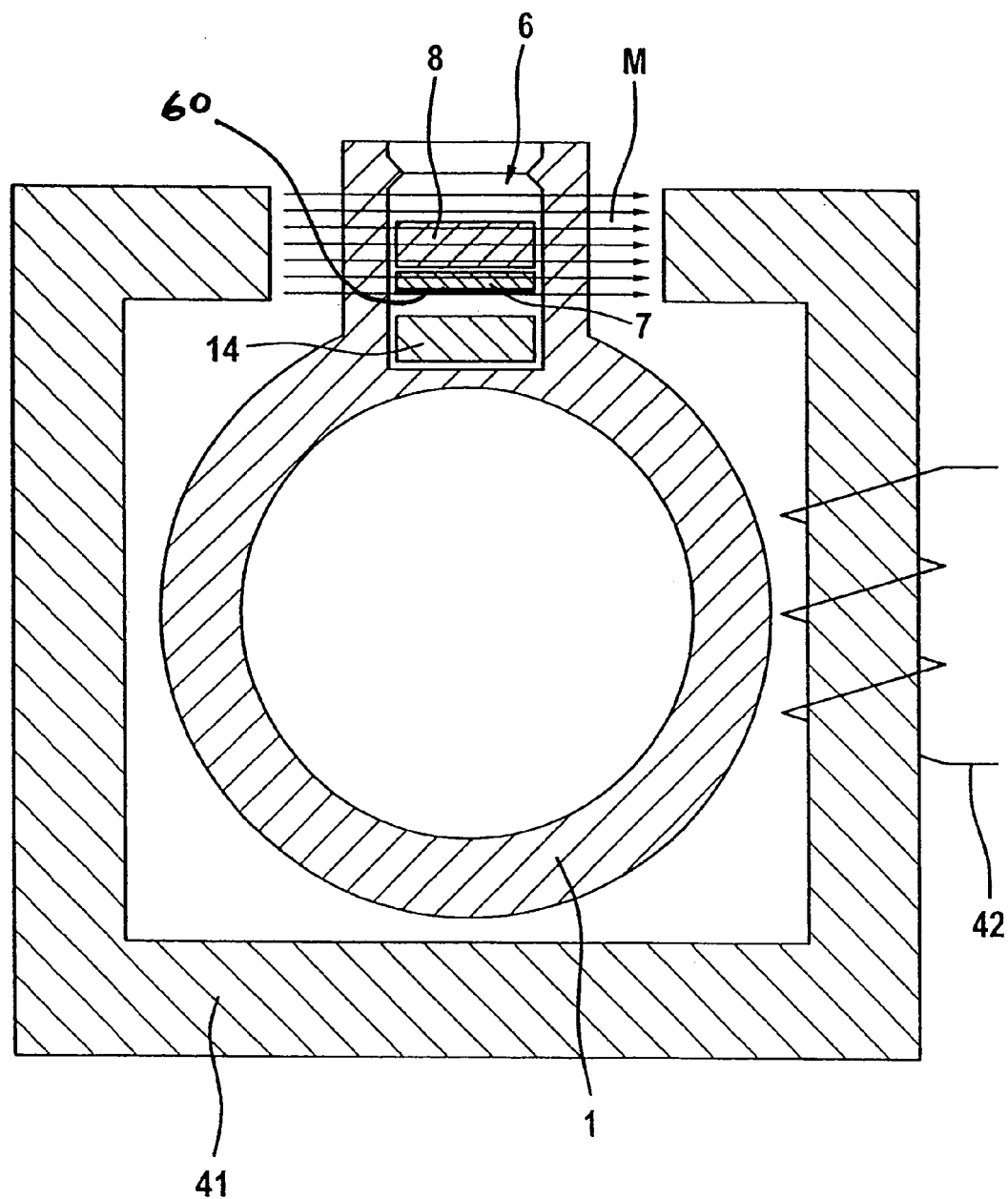
FIG. 20 a seventh embodiment of a master cylinder according to the present invention.

FIG. 20 shows another, seventh embodiment of the master cylinder 1 in a very schematic manner. Valve 6 is provided with a first abutment element 8, a closing element 7 and a second abutment element 14. The material of the closing element 7 and the first abutment element 8 is chosen in such a way that the closing element 7 is maintained in its opening position during the evacuation by means of the magnetic field M.

The magnetic field M the field lines of which are parallel to the closing member 7, is generated during the evacuation of the brake system on the master cylinder 1 from the outside by means of a yoke 41 and a coil 42. The first abutment element 8 and the closing element 7 are made of ferromagnetic materials and are magnetized in the same direction by the magnetic field M. Therefore they repel each other and the closing element 7 is pressed into its opening position onto the second abutment element 14 which is made of a non-ferromagnetic material. The selection of suitable material prevents cementing the magnetized parts.

The entire structure for generating magnetic field M can also be integrated in the filling system of the automotive manufacturer.

In order to maintain closing element 7 in its opening position when the brake system is evacuated, the following embodiments are conceivable:

A weight 60 hangs on closing element 7 pressing it in its opening position onto the abutment element 14. The density of the material is such that the weight 60 is nearly neutralized in the pressure fluid.

A weight is acting from above on closing element 7 by means of a pin pressing it on abutment element 14. The weight should have no effect in pressure fluid (float).

A locking pin achieves a lock by being actuated by means of the filling pressure, being pressed into a bore and thus releasing closing element 7.

Figure 21:
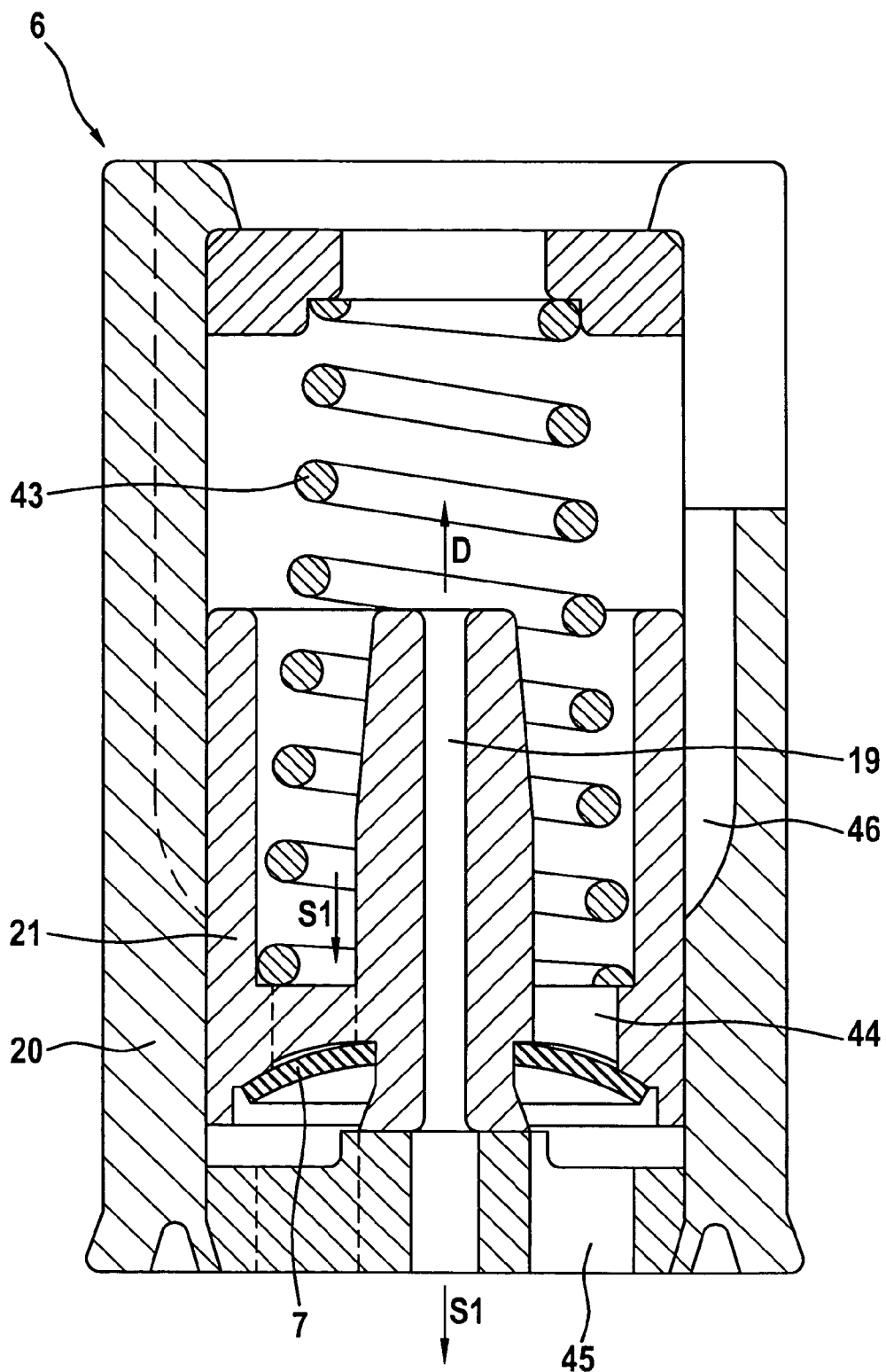
FIG. 21 an eighth embodiment of a master cylinder according to the present invention.

FIG. 21 shows a valve 6 of the eighth embodiment of a master cylinder 1 which can be inserted into the reservoir bore 4 of master cylinder 1 but also into the connecting socket 28 of pressure fluid reservoir 5. A displaceable valve seat 21 is arranged in a valve housing 20 of valve 6 by preloading a spring 43. The valve seat 21 is provided with through-bores 44 which can be closed by a closing element 7 (closing position) already when a small pressure difference is reached and prevent the pressure fluid flow S2 from the pressure chamber 3 into pressure fluid reservoir 5. In case of a pressure fluid flow S1 from the pressure fluid reservoir 5 into pressure chamber 3, the closing element 7 opens (opening position) allowing pressure fluid to flow in the aspiration direction (pressure fluid flow S1), so that pressure fluid can reach the pump during an intervention of the brake system independent of the driver. An additional pressure fluid connection 19 is provided as throttle bore in the valve seat 21 and is chosen to be so narrow that only a throttled amount D of pressure fluid is allowed to flow from the pressure chamber 3 to the pressure fluid reservoir 5 during pressure build-up in pressure chamber 3. When a certain pressure from pressure chamber 3 towards the arrow D is reached, the valve seat 21 is lifted up by such an amount that pressure fluid is allowed to flow through an access 45 and a groove channel 46 in the valve housing 20, in order to be able to quickly reduce the pressure of the wheel brakes (ABS), for example.

Figure 22:
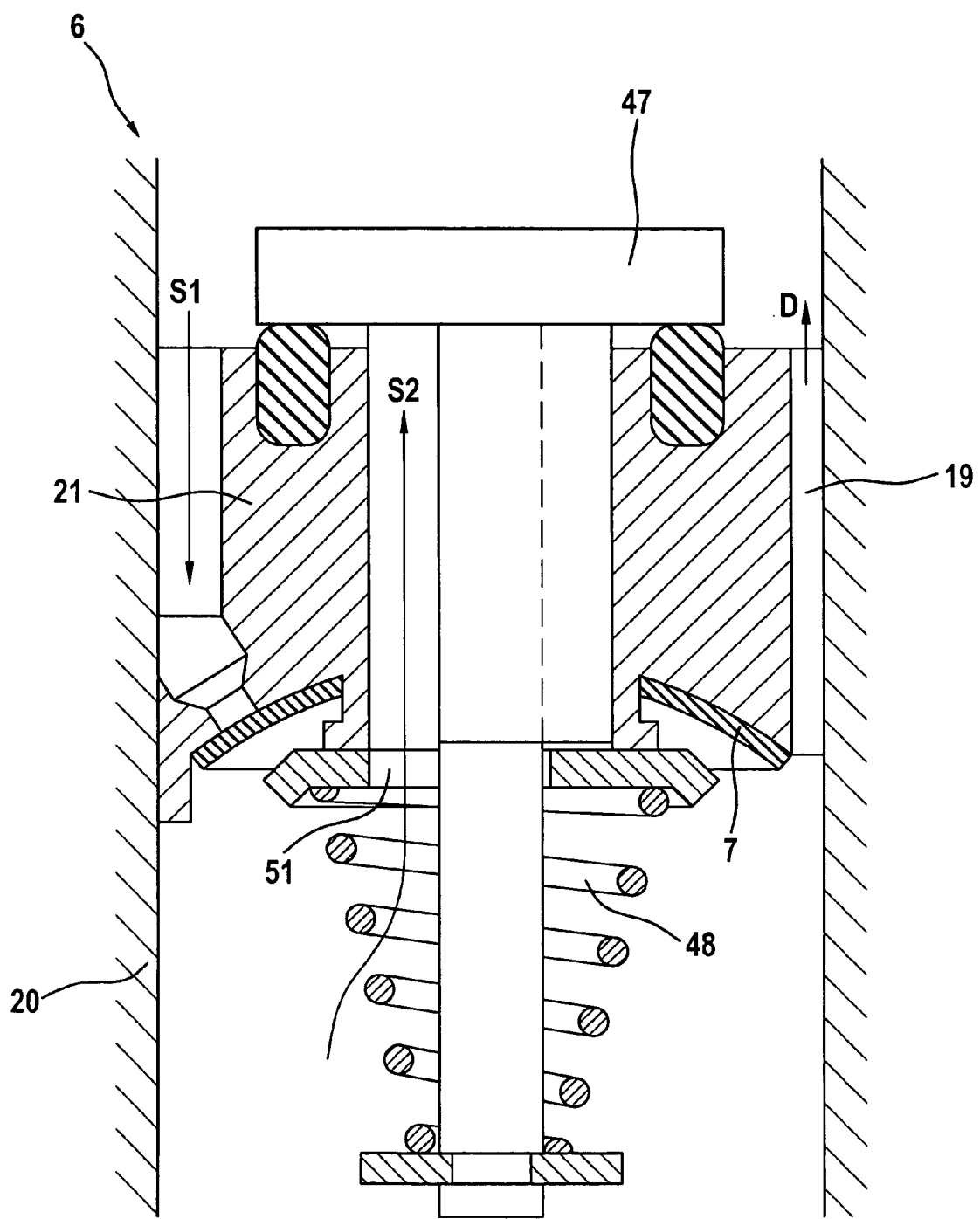
FIG. 22 a ninth embodiment of a master cylinder according to the present invention.

In FIG. 22 the throttled pressure fluid connection 19 is adjoins a peripheral surface of valve seat 21 by inserting a suitable groove there. The closing element 7 allows a first pressure fluid flow S1 from the pressure fluid reservoir 5 into the pressure chamber 3 (opening position) and closes the second pressure fluid flow S2 from the pressure chamber 3 into the pressure fluid reservoir 5 (closing position). When a certain pressure from the pressure chamber 3 is reached, a tappet 47 is lifted up from the valve seat 21 against the force of a spring 48 preloading the tappet 47 thus allowing a pressure fluid flow S2 through an access 51.

Figure 23:
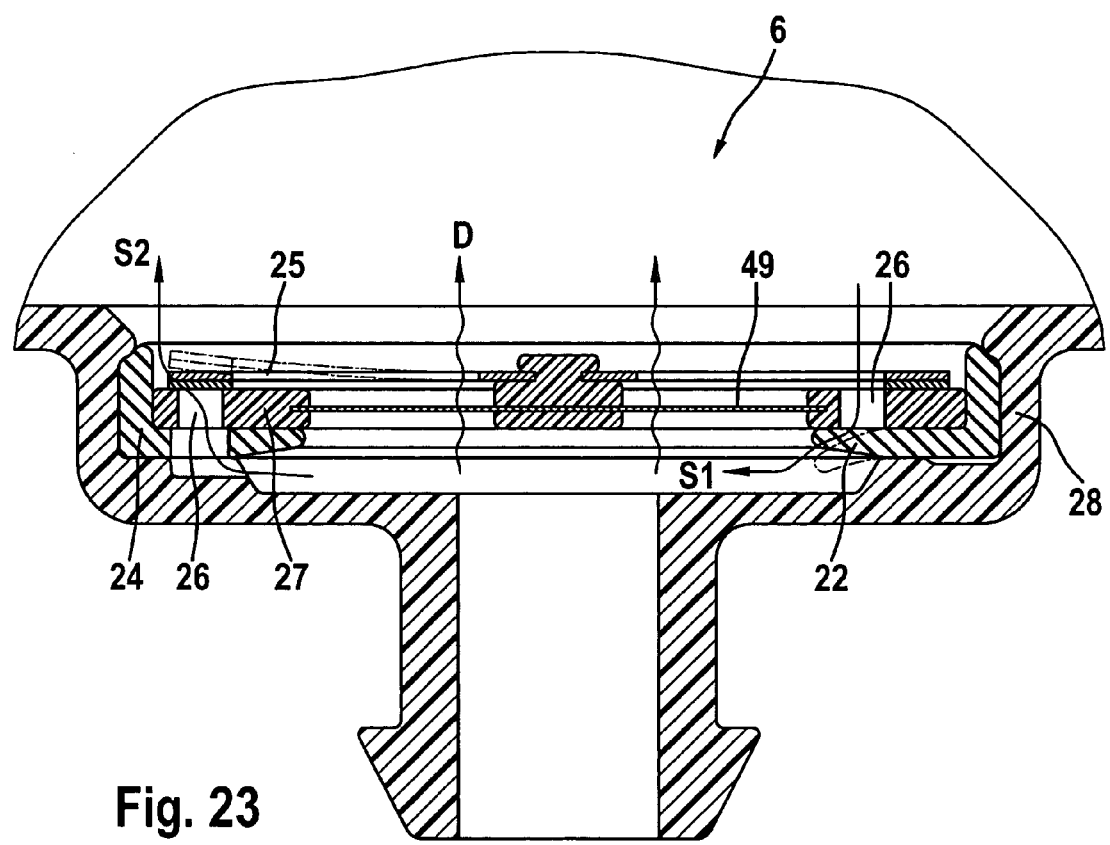
FIG. 23 a tenth embodiment of a master cylinder according to the present invention.

FIG. 23 shows a tenth embodiment of a master cylinder 1 with a valve 6 being arranged in the connecting socket 28 of the pressure fluid reservoir 5. A permeable membrane 49 arranged in a valve body 27 presenting a high amount of flow resistance ensures the throttle function. The closing element 7 is formed by a sealing element 24 with a first sealing lip 22 preventing the pressure fluid flow S2 from the pressure chamber 3 into the pressure fluid reservoir 5 through through-bores 26 in valve seat 27 and allowing the pressure fluid flow S1 into the pressure chamber 3. In the opposite direction a second sealing lip 23 may also inhibit the pressure fluid flow S1 and allow a pressure fluid flow S2, as e.g. is shown in FIG. 24 in an eleventh embodiment.

In the embodiment according to FIG. 23 the through-bores 26 of valve body 27 are closed by a first sealing lip 22 and a leaf spring 25. The first sealing lip 22 and the leaf spring 25 are designed and arranged in such a way that one part of the through-bores 26 is freely accessible from above and the other part of the through-bores is freely accessible from below, while the other end of these through-bores is respectively closed by the leaf spring 25 or the sealing lip 22. The spring constants, respectively the pressure needed for the opening is very much higher towards the pressure fluid reservoir 5 than towards the pressure chamber 3.

Figure 24:
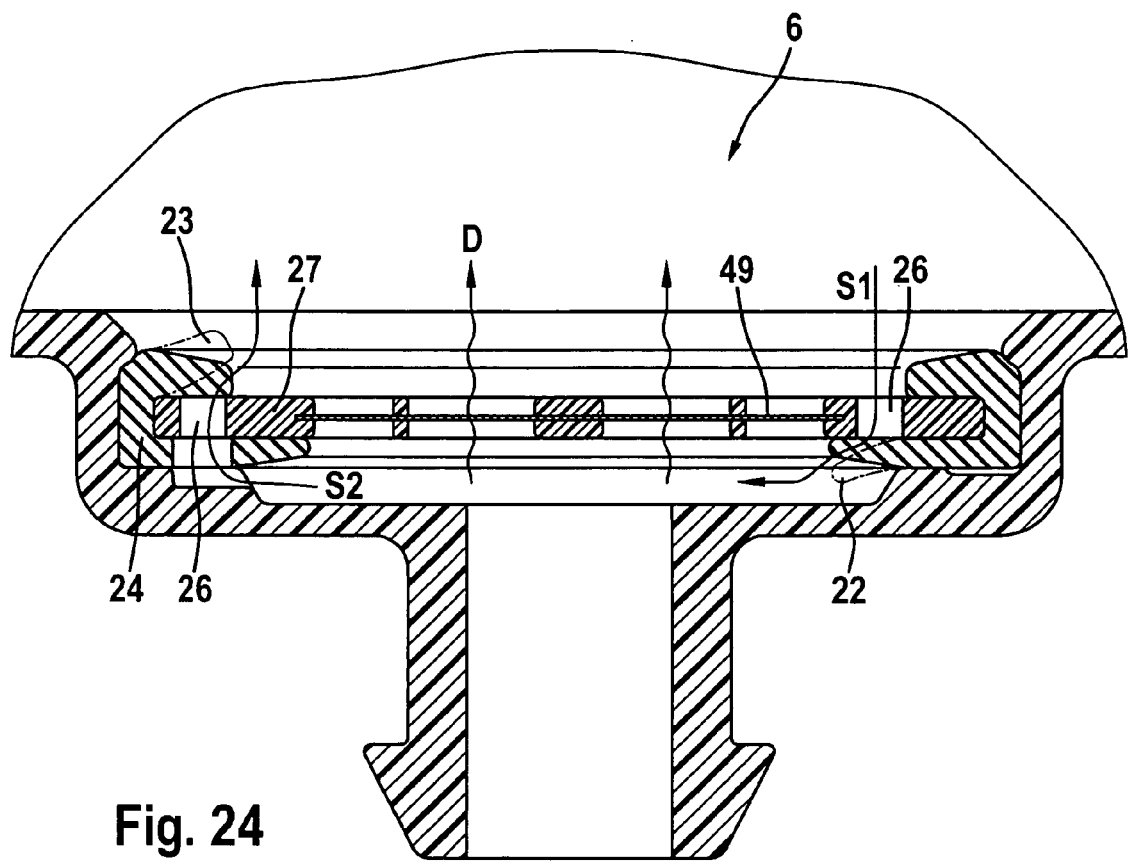
FIG. 24 an eleventh embodiment of a master cylinder according to the present invention.
Figure 25:
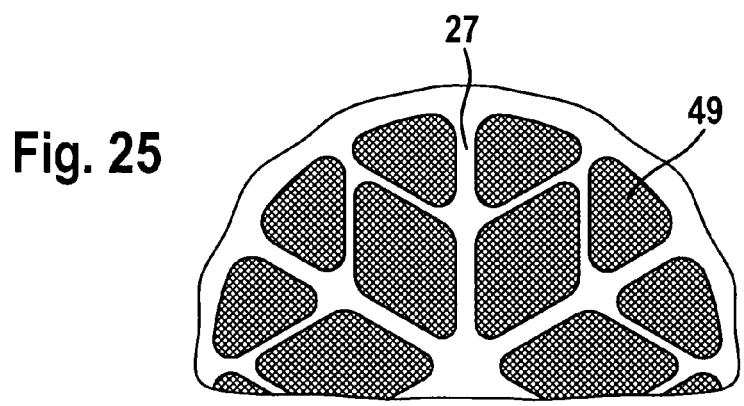
FIG. 25 a top view on the embodiment according to FIG. 24 in broken-up representation.

This principle can be evinced from FIG. 24 and FIG. 25. It is obvious that the lower sealing lip 22 is much smaller and longer than the upper sealing lip 23. Thus the upper sealing lip 23 is much stiffer than the lower sealing lip 22 so that the attributed through-bores 26 are opened in case of a pressure difference.

FIG. 25 shows a top view of the permeable membrane 49 arranged in the valve body 27.

The embodiments according to the FIGS. 21 to 25 can thus be described as follows.

The generation of an overpressure in master cylinder 1 is required before the central valves are closed by the relative travel with the consequence that the pressure fluid volume is available to the brake system during this travel and does not flow unused into the pressure fluid reservoir 5. The advantage is a reduction of the lost travel on the brake pedal. This is achieved by means of a valve 6 being preferably arranged between pressure fluid reservoir 5 and master cylinder 1. On the one hand, the valve 6 has to allow the aspiration of the master cylinder 1, generate a certain pressure in case of a quick pedal depression and on the other hand it has to connect the master cylinder 1 with the pressure fluid reservoir 5 so that no residual pressure remains in the brake system.

Embodiment according to FIG. 21: The closing element 7 allows the aspiration, the valve seat 21 preloaded by a spring 43 opens the way to one or more channels 46 when a certain pressure is reached. A throttled pressure fluid connection (throttle bore) 19 allows a pressure compensation of the brake system when it is not actuated.

Embodiment according to FIG. 22: Instead of valve seat 21 a tappet 47 is provided which allows the pressure fluid flow S2 into the pressure fluid reservoir 5 when a certain pressure is reached.

Embodiments according to FIGS. 23, 24: valve body 27 with an integrated permeable membrane 49 safeguards a space-saving construction with a simple effect. By a suitable reinforcement and the interaction with the contour of the pressure fluid reservoir the sealing lips 22, 23 or sealing lip 22 and leaf spring 25, respectively, allow the required functions. At the same time the valve 6 is fastened in a sealant manner in the pressure fluid reservoir.

The permeable membrane 49 provides for reducing the residual pressure in the brake system with the advantage that this is more resistant to dirt and more independent than a throttle-bore as regards consistency.

The embodiments according to FIGS. 21 to 25 have the following advantages:
- lost travel reduction
- no packaging problems
- cost-effective, secure concept
- proven central valves are maintained to a great extent (ABS-capable)
- closing travel of the central valve has no effect to the pedal travel

LIST OF REFERENCE NUMERALS:

1 Master cylinder
2 Housing
3 Pressure chamber
4 Reservoir bore
5 Pressure fluid reservoir
6 Valve
7 Closing element
8 First abutment element
9 Bottom
10 Sealing bead
11 Upper side
12 Web
13 Channel
14 Second abutment element
15 Projection
16 Clamping element
17 Tensioning element
18 Locking element
19 Pressure fluid connection
20 Valve housing
21 Valve seat
22 First sealing lip
23 Second sealing lip
24 Sealing element
25 Leaf spring
26 Through-bore
27 Valve body
28 Connecting socket
29 Sealing element
30 Pressure fluid channel
31 Web
32 Shoulder
33 Restrictor
34 Through-bore
35 Supporting surface
36 Bore
37 Groove
38 Projection
39 Inner wall
40 Spring
41 Yoke
42 Coil
43 Spring
44 Through-bore
45 Access
46 Channel
47 Tappet
48 Spring
49 Membrane
50 Bottom side
51 Access
D Throttled pressure fluid flow
H Fulcrum K Adhesive
L Air flow
M Magnetic field
S1 Pressure fluid flow
S2 Pressure fluid flow

The invention claimed is:

1. Master cylinder for a hydraulic brake system with at least one pressure chamber provided in a housing of the master cylinder and at least one housing bore for accommodating a pressure fluid reservoir, a valve with a closing element being provided which due to a pressure difference prevailing between the pressure chamber and the pressure fluid reservoir can be moved into an opening position or a closing position, the valve in its opening position allowing a pressure fluid flow from the pressure fluid reservoir into the pressure chamber and in its closing position throttling or preventing a pressure fluid flow in the opposite direction to the pressure fluid flow from the pressure chamber into the pressure fluid reservoir, wherein means are provided which maintain the closing element in the opening position when it is acted upon by a closing pressure difference due to an evacuation for the purpose of vacuum filling of the brake system, and allow the closing element to move in the closing position when the brake is actuated.

2. Master cylinder according to claim 1, wherein the valve is provided with a first abutment element arranged in the reservoir bore for supporting the closing element in the closing position, the closing element being arranged in a moveable manner between the abutment element and a bottom of the reservoir bore and the abutment element being provided with a circumferential sealing bead on the bottom side facing the closing element which is arranged in such a way that a radially outer area of an upper side of the closing element in its opening position abuts on the sealing bead in a sealing manner.

3. Master cylinder according to claim 2, wherein the closing element is formed as a disc and provided with webs formed towards the bottom of the reservoir bore, the webs abutting on the bottom in the opening position and guaranteeing the pressure fluid flow from the pressure fluid reservoir into the pressure chamber.

4. Master cylinder according to claim 2, wherein the closing element is formed as a disc and provided with webs on its circumference, which in the opening position allow an abutment of the disc on a circumferential shoulder of the reservoir bore and guarantee the pressure fluid flow from the pressure fluid reservoir into the pressure chamber.

5. Master cylinder according to claim 2, wherein the valve in its closing position opens when a certain pressure difference is reached allowing the unthrottled pressure fluid flow from the pressure chamber into the pressure fluid reservoir.

6. Master cylinder according to claim 5, wherein the abutment element on its bottom side is provided with projections which serve as fulcrum for the closing body in the closing position when the pressure difference is reached which opens the valve, the closing element deflecting and the radially outer area of the upper side of the closing element detaching from the sealing bead allowing the unthrottled pressure fluid flow from the pressure chamber into the pressure fluid reservoir.

7. Master cylinder according to claim 6, wherein the valve is provided with a second abutment element with channels following the first abutment element in the reservoir bore towards the bottom, the second abutment element serving for supporting the closing element in its opening position.

8. Master cylinder according to claim 7, wherein the material of the closing body and the abutment elements is chosen in such a way that a magnetic field acting from the outside during the evacuation of the brake system maintains the closing element in its opening position.

9. Master cylinder according to claim 5, wherein the valve is provided with a throttled pressure fluid connection allowing a throttled pressure fluid flow from the pressure chamber into the pressure fluid reservoir when the closing element is in its closing position.

10. Master cylinder according to claim 9, wherein the valve is inserted in a connection area between the master cylinder and the pressure fluid reservoir.

11. Master cylinder according to claim 10, wherein the valve is arranged in a connecting socket of the pressure fluid reservoir.

12. Master cylinder according to claim 9, wherein the master cylinder is provided with a central valve and a supply bore and that the valve is inserted in a connecting path between the central valve or the supply bore and the pressure fluid reservoir.

13. Master cylinder according to claim 9, wherein the master cylinder is provided with a central valve or a supply bore and that the valve is inserted in a connecting path between the central valve or the supply bore and the pressure fluid reservoir.

14. Master cylinder according to claim 2, wherein a sleeve-type tensioning element is provided in the first abutment element projecting during the evacuation of the brake system from the first abutment element towards the closing element in such a manner that it maintains the closing element in its opening position, a pressure difference caused by the first actuation of the brake and closing the valve moving the closing element into its closing position, the closing element pushing back the tensioning element into the first abutment element so that a movement of the closing element into the closing position is possible when the brake is actuated.

15. Master cylinder according to claim 1, wherein an adhesive maintains the closing element in its opening position during the evacuation of the brake system, the adhesive dissolving on contact with the pressure fluid during the vacuum filling.

16. Master cylinder according to claim 1, wherein a clamping element maintains the closing element in its opening position during the evacuation of the brake system, where the clamping element detaches when the system is filled with pressure fluid under vacuum.

17. Master cylinder according to claim 1, wherein the closing element is provided with circumferential locking elements which during the evacuation of the system maintain the closing element in the opening position by means of a mechanical locking which is detachable when the pressure fluid is filled in during the filling under vacuum.

18. Master cylinder according to claim 1,
wherein during the evacuation of the brake system a weight is fastened at the closing element which maintains the closing element in its opening position, the material of which is chosen in such a way that the weight is nearly neutralized in the pressure fluid when the brake is actuated.

19. Method for filling a brake system under vacuum by using a master cylinder according to claim 1 comprising the steps of:
generating a magnetic field outside of the master cylinder during an evacuation of the brake system; and
maintaining the closing element of the valve in its opening position with the magnetic field thus allowing an unhindered air flow from the pressure chamber into the pressure fluid reservoir and thus allowing a venting of the brake system.

20. A master cylinder for a hydraulic brake system with at least one pressure chamber provided in a housing of the master cylinder and at least one housing bore for accommodating a pressure fluid reservoir, a valve with a closing element being provided which due to a pressure difference prevailing between the pressure chamber and the pressure fluid reservoir can be moved into an opening position or a closing position, the valve in its opening position allowing a pressure fluid flow from the pressure fluid reservoir into the pressure chamber and in its closing position throttling or preventing a pressure fluid flow in the opposite direction to the pressure fluid flow from the pressure chamber into the pressure fluid reservoir,
wherein means are provided which maintain the closing element in the opening position when it is acted upon by a closing pressure difference due to an evacuation for the purpose of vacuum filling of the brake system, and allow the closing element to move in the closing position when the brake is actuated,
wherein the valve in its closing position opens when a certain pressure difference is reached allowing the unthrottled pressure fluid flow from the pressure chamber into the pressure fluid reservoir,
wherein the valve is provided with a throttled pressure fluid connection allowing a throttled pressure fluid flow from the pressure chamber into the pressure fluid reservoir when the closing element is in its closing position, and
wherein the valve is provided with a valve housing in which a valve seat is mounted which can be displaced in longitudinal direction and that a second channel can be connected by means of the valve seat.

21. Master cylinder according to claim 20,
wherein the valve seat restricts at least in part the throttled pressure fluid connection.

22. A master cylinder for a hydraulic brake system with at least one pressure chamber provided in a housing of the master cylinder and at least one housing bore for accommodating a pressure fluid reservoir, a valve with a closing element being provided which due to a pressure difference prevailing between the pressure chamber and the pressure fluid reservoir can be moved into an opening position or a closing position, the valve in its opening position allowing a pressure fluid flow from the pressure fluid reservoir into the pressure chamber and in its closing position throttling or preventing a pressure fluid flow in the opposite direction to the pressure fluid flow from the pressure chamber into the pressure fluid reservoir,
wherein means are provided which maintain the closing element in the opening position when it is acted upon by a closing pressure difference due to an evacuation for the purpose of vacuum filling of the brake system, and allow the closing element to move in the closing position when the brake is actuated,
wherein the valve in its closing position opens when a certain pressure difference is reached allowing the unthrottled pressure fluid flow from the pressure chamber into the pressure fluid reservoir,
wherein the valve is provided with a throttled pressure fluid connection allowing a throttled pressure fluid flow from the pressure chamber into the pressure fluid reservoir when the closing element is in its closing position, and
wherein the valve includes a valve body, a sealing element with a sealing lip and a leaf spring, the sealing lip allowing the pressure fluid flow from the pressure fluid reservoir into the pressure chamber and the leaf spring allowing the pressure fluid flow in the opposite direction when a certain pressure difference is reached.

23. Master cylinder according to claim 22,
wherein the valve body is provided with a permeable membrane which allows the throttled pressure fluid flow from the pressure chamber into the pressure fluid reservoir.

24. A master cylinder for a hydraulic brake system with at least one pressure chamber provided in a housing of the master cylinder and at least one housing bore for accommodating a pressure fluid reservoir, a valve with a closing element being provided which due to a pressure difference prevailing between the pressure chamber and the pressure fluid reservoir can be moved into an opening position or a closing position, the valve in its opening position allowing a pressure fluid flow from the pressure fluid reservoir into the pressure chamber and in its closing position throttling or preventing a pressure fluid flow in the opposite direction to the pressure fluid flow from the pressure chamber into the pressure fluid reservoir,
wherein means are provided which maintain the closing element in the opening position when it is acted upon by a closing pressure difference due to an evacuation for the purpose of vacuum filling of the brake system, and allow the closing element to move in the closing position when the brake is actuated,
wherein the valve in its closing position opens when a certain pressure difference is reached allowing the unthrottled pressure fluid flow from the pressure chamber into the pressure fluid reservoir,
wherein the valve is provided with a throttled pressure fluid connection allowing a throttled pressure fluid flow from the pressure chamber into the pressure fluid reservoir when the closing element is in its closing position, and
wherein the valve includes a valve body and a sealing element with two sealing lips, the first sealing lip allowing the pressure fluid flow from the pressure fluid reservoir into the pressure chamber and the second sealing lip allowing the pressure fluid flow in the opposite direction when a certain pressure difference is reached.

25. Master cylinder according to claim 24,
wherein the valve body is provided with a permeable membrane which allows the throttled pressure fluid flow from the pressure chamber into the pressure fluid reservoir.

* * * * *